United States Patent [19]

Tesselaar et al.

[11] Patent Number: 5,537,768
[45] Date of Patent: Jul. 23, 1996

[54] DISPLAY STAKES FOR POTTED PLANTS

[75] Inventors: Anthony I. Tesselaar; Peter K. Bayly, both of Melbourne, Australia

[73] Assignee: Flower Carpet Pty. Ltd., Victoria, Australia

[21] Appl. No.: 198,329

[22] Filed: Feb. 18, 1994

[30] Foreign Application Priority Data

Feb. 18, 1993 [AU] Australia .................................. PL7366
Aug. 13, 1993 [AU] Australia .................................. PM0577

[51] Int. Cl.⁶ .................................................. G09F 23/00
[52] U.S. Cl. ............................................. 40/645; 40/668
[58] Field of Search ............................ 40/645, 306, 658, 40/668; 52/103

[56] References Cited

U.S. PATENT DOCUMENTS

| | | | |
|---|---|---|---|
| 551,578 | 12/1895 | Chapman et al. | 40/645 |
| 1,073,114 | 9/1913 | Gudgeon | 40/645 X |
| 1,839,016 | 12/1931 | Dodd | 40/658 X |
| 1,863,608 | 6/1932 | Stewart | 40/645 |
| 2,639,524 | 5/1953 | Irving | 40/645 |
| 4,027,410 | 6/1977 | Wheeler | 40/645 |
| 4,393,622 | 7/1983 | Gallo, Sr. | 40/645 X |
| 4,882,862 | 11/1989 | Slavsky, Sr. | 40/658 X |
| 5,044,200 | 9/1991 | Dailey et al. | 40/645 X |
| 5,279,420 | 1/1994 | Rodgers | 40/668 X |

FOREIGN PATENT DOCUMENTS

| | | |
|---|---|---|
| 2563356 | 10/1985 | France . |
| 199394 | 3/1986 | New Zealand . |
| 214085 | 1/1988 | New Zealand . |
| 2260308 | 4/1993 | United Kingdom . |

Primary Examiner—Joanne Silbermann
Attorney, Agent, or Firm—Oliff & Berridge

[57] ABSTRACT

A label display stake for use with plant containers and which is formed as a single piece, preferably from a plastics material. The stake has an elongate body having an upper label carrying portion, and a lower mounting portion which is located within a plant container when the stake is in use. Label attaching structure is provided on the upper portion and is operative to resist separation of the label from the stake. In one form, the label attaching structure holds the label at a particular disposition for convenient viewing and also holds the label against rotation about the axis of the stake. Mounting structure is provided on the stake for cooperation with a plant container so as to hold the stake against a side of the container and also resist removal of the stake from the container. Stabilizing structure may be provided on the stake so as to hold it against lateral tilting relative to the container.

20 Claims, 5 Drawing Sheets

DISPLAY STAKES FOR POTTED PLANTS

FIELD OF THE INVENTION

This invention relates to the display of labels for potted plants and is particularly concerned with display stakes for such labels.

BACKGROUND OF THE INVENTION

Label presentation plays an important part in the marketing of plants to the public. Customers wish to be able to see the relevant information about a plant quickly without having to find a label which has fallen down the display stake or is attached to part of the plant and is therefore hidden by leaves.

At present, most potted plants are provided with a display stake comprising a plain wooden or plastic stake which is pushed into the soil in the pot and to which a label is manually attached by means of the usual plastic coated wire tie. Such display stakes suffer from several disadvantages including the fact that the label is easily able to slip down the stake, where it may be difficult to locate, or may slip off the top of the stake due to wind or manual removal, leaving the plant without a label. Furthermore, stakes are easily removed and may be replaced by a stake bearing a label having a lower price, creating obvious disadvantages for the retailer.

SUMMARY OF THE INVENTION AND OBJECT

It is an object of the invention to provide a display stake of the kind indicated which is of relatively simple construction, provides secure retention for a separately formed label, and is able to be conveniently and securely attached to a plant container.

A display stake according to one aspect of the present invention is characterised in that it has mounting means which is cooperable with a plant container so as to resist separation from that container, and label attaching means which is operative to resist separation of a label from the stake. The label attaching means may be also arranged to facilitate attachment of a label to the stake.

According to another aspect of the invention, the display stake includes either the mounting means or the label attaching means, but not both. It is generally the case however, that the stake will include both features.

In one arrangement, the display stake is an elongate member having a lower portion which is insertable into the body of soil within a plant container, and an upper portion which projects above the body of soil and carries or forms the label attaching means. It is preferred that the mounting means is located between the upper and lower extremities of the stake at a position such as to be cooperable with an upper part of a plant container, and in that event it may very well be at or adjacent the junction between the upper and lower portions of the stake. It is also preferred that the lower portion of the stake includes stabilizing means which cooperates with the body of soil within which it is inserted so as to resist lateral tilting of the stake, but other stabilizing means could be adopted. For example, additional or alternative stabilizing means could cooperate with the plant container.

The length of the upper and lower portions of the stake can be selected as appropriate according to particular circumstances. It is preferred that the length of the upper portion is such that a label carried by that portion is readily visible above the side wall of an associated container and is also visible above at least part of the body of foliage of a plant within the container. That is, the height of the upper portion will generally be selected having regard to the nature of the plant with which the stake is to be associated.

Many plant containers have a rim around the open mouth of the container, and it may be convenient for the mounting means to clip over or otherwise cooperate with that rim so as to hold the stake in position. Various types of mounting means may be adopted for that purpose, but in a preferred form the mounting means includes a U-shaped flexible clip which is able to locate over the rim of a plant container, and which has a detent arranged to snap beneath a lower edge of that rim and thereby resist separation of the stake from the plant container. The detent preferably has an operative surface which engages the lower edge of the rim, and that surface may slope or be otherwise arranged so that the mounting means will be effective with container rims of various sizes. It is also envisaged that the mounting means may have two or more detents, and such detents may be relatively arranged to facilitate attachment to rims of different sizes.

The label attaching means may include at least one stop which is positioned on the stake so that part of a label can be located within a retention zone between the stop and the lower portion of the stake. The stop is operative to resist passage of the label along the stake away from the lower portion so as to be removed from the retention zone. The retention zone may be defined between the aforementioned stop and another stop which is spaced from the first in the longitudinal direction of that part of the stake on which the stops are located. Each stop is operative to resist movement of the label out of the retention zone. Preferably, the stops are both located at or adjacent an upper end section of the stake.

In one particularly satisfactory arrangement, the label attaching means includes at least one stop surface which faces generally towards the lower end of the stake, and beneath which a label can be located. For that purpose, the label may have an apertured attaching portion, and an upper end section of the stake is adapted to pass through the aperture so that the label can be located at the stop surface. It is preferred that the label attaching means of the stake is configured so that the label needs to be forced or deliberately manipulated in some way in order to position the attaching portion of the label beneath the stop surface. The arrangement is such that there is an effective hinderance to movement of the label back past the stop surface so as to be detachable from the upper end section of the stake.

A display stake embodying the invention is suitable for use with separately formed labels of various types. By way of example, the stake may be used with a label having an aperture through which part of the stake can be projected. However, the invention is also applicable to separately formed labels which are attached by means of plastic coated metal ties, and although such a label may be removed by undoing the tie, the display stake embodying the invention still provides a deterrent to removal since it prevents the label simply being slipped off the stake.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

DETAILED DESCRIPTION OF EXAMPLE EMBODIMENTS

Figure 1:
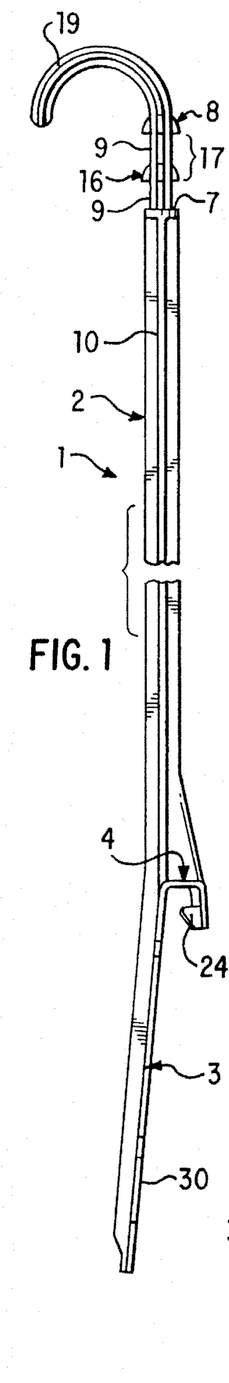
FIG. 1 it is a side elevation view of a stake according to one embodiment of the invention.
Figures 2, 4, 5, 6, 7:
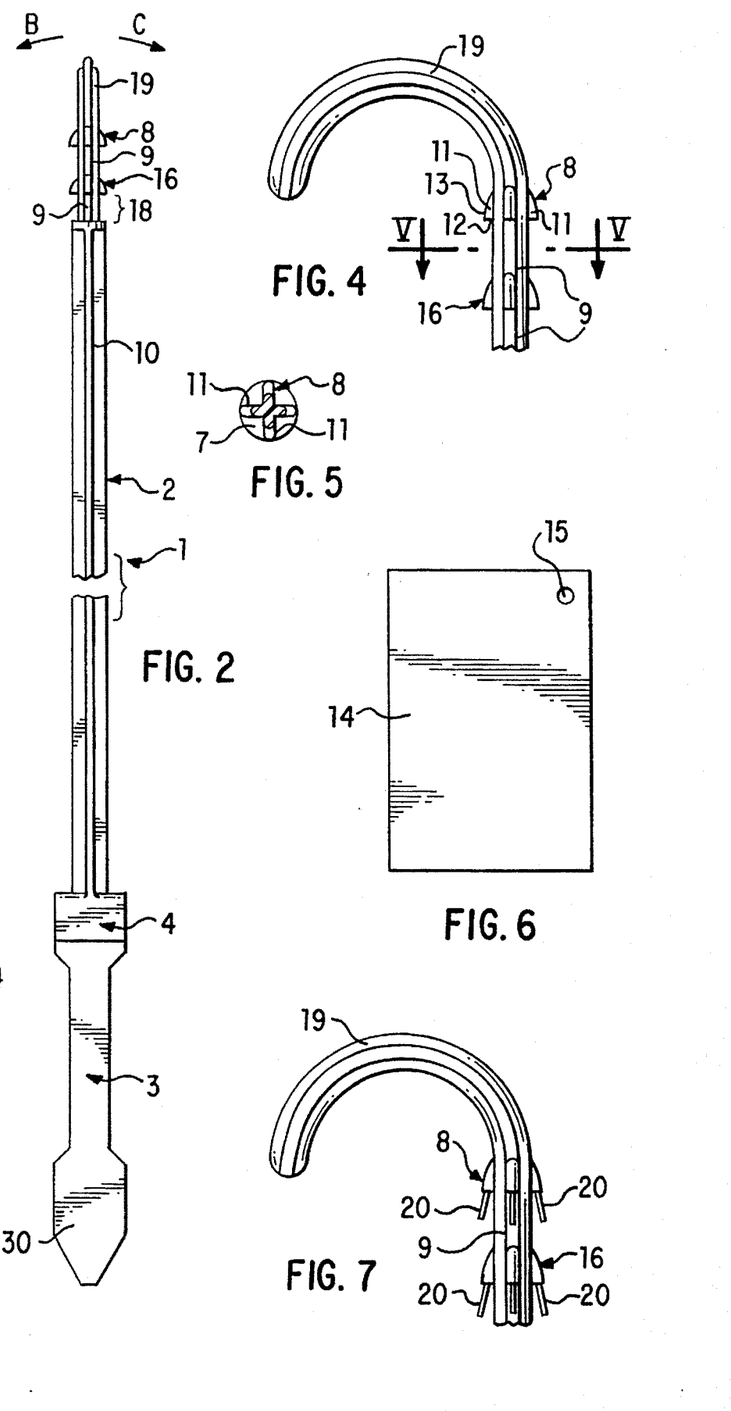
FIG. 2 is a front view of the stake shown in FIG. 1.
FIG. 4 is an enlarged view of the upper end section of the stake shown in FIG. 1.
FIG. 5 is a cross-sectional view taken along line V—V of FIG. 4.
FIG. 6 is a view of one form of label which might be used with the stake of FIG. 1.
FIG. 7 is a view similar to FIG. 4 but showing a modification the label attaching means.

The example display stake 1 shown in FIGS. 1 and 2 of the drawings is an elongate member which may be conveniently moulded or otherwise formed from a suitable material such as a plastics material. The stake 1 has an upper portion 2 which is adapted to receive and retain a separately formed label, and a lower portion 3 which is adapted to penetrate into a body of soil within a plant container. Container mounting means 4 is provided on the stake 1, and in the arrangement shown that mounting means 4 is at or adjacent the junction between the upper and lower portions 2 and 3 of the stake. The mounting means 4 could be constructed in a manner quite different to that shown in FIGS. 1 and 2 of the drawings, and may cooperate with a container in a manner quite different to that hereinafter described with reference to those drawings.

Figures 3, 8:
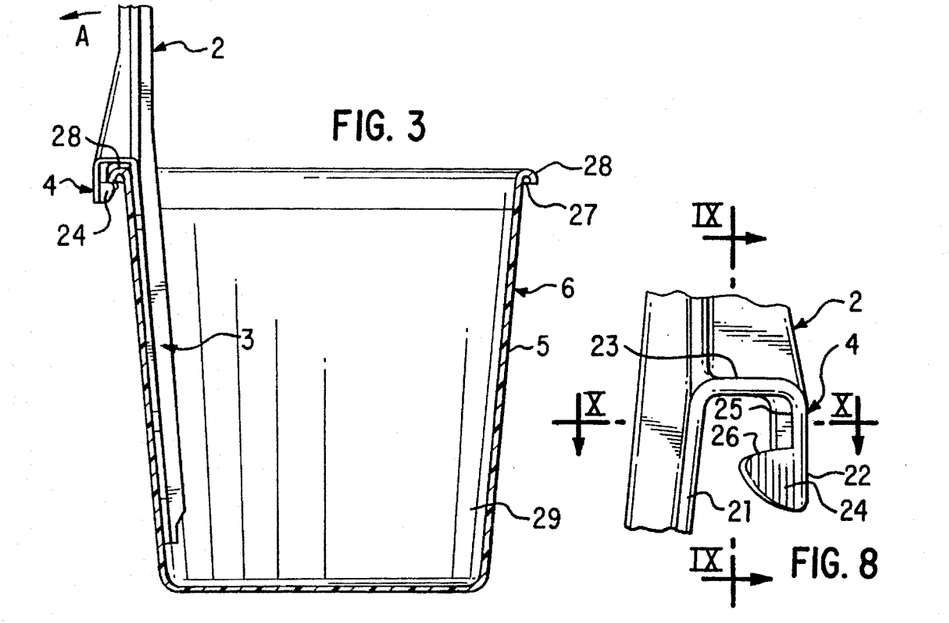
FIG. 3 shows the stake of FIG. 1 in association with a plant container.
FIG. 8 is an enlarged side view of the mounting means of the stake of FIG. 1.

It will be seen from FIG. 1 that the lower portion 3 is arranged at an angle relative to the upper portion 2. Such an angular arrangement may or may not be adopted, and if adopted has the advantage of enabling the upper portion 2 to be kept close to a vertical disposition when the stake 1 is attached to a plant container. It is quite common for the side wall 5 of a plant container 6 to slope as shown in FIG. 3. When the stake 1 as shown is used with such a container 6, the lower portion 3 can follow the slope of the side wall 5 while the upper portion 2 remains substantially upright.

In the particular arrangement shown in FIGS. 1 and 2, the label retention zone is formed between the stop shoulder 7 and the stop member 8, but other arrangements could be adopted. The shoulder 7 faces upwards as shown, and is formed at the junction of two sections 9 and 10 of the upper portion 2 which are of relatively small and relatively large cross-sectional size respectively.

The stop member 8 forms an enlargement on the section 9, and in the particular arrangement shown is formed by four separate elements 11 (FIGS. 4 and 5). Each of the elements 11 has an abrupt lower stop surface 12 and an upper sloping ramp surface 13, and those surfaces function as hereinafter described. It is to be understood that the elements 11 could be of a form different to that shown and could be of a different number.

FIG. 6 shows in diagrammatic form one type of label 14 which is suitable for use with the stake 1. That label 14 has an aperture 15 which need not be located as shown and which has a size related to the cross-sectional sizes of the section 9, the stop shoulder 7 and the stop member 8 respectively. In particular, the size of the aperture 15 is predetermined so that it can receive, perhaps with clearance, the section 9, but cannot allow unimpeded passage of the stop member 8 or the stake portion 10. The ramp surfaces 13 are intended to facilitate forced movement of the label 14 over the stop member 8 in a direction towards the shoulder 7. The abrupt surfaces 12 however, make it difficult for the label 14 to be moved back over the member 8 in the reverse direction. The member 8 therefore operates something in the manner of a ratchet.

The particular stake 1 shown in the drawings includes a second stop member 16 located between the shoulder 7 and the member 8. That second stop member 16 may have a form the same as or similar to that of the member 8, and divides the label retention zone into two parts, an upper part 17 and a lower part 18. Such division allows a label to be retained in one part, and another item to be retained in the other part. By way of example, that other item may be a small bag containing plant food, and that bag may have an aperture corresponding to the label aperture 15 so as to facilitate location of the bag within the retention zone.

In the particular arrangement shown, the terminal part 19 of the upper portion 2 is of hook-like form. That has the benefit of adding to the difficulty in removing a label from the stake. It has the further benefit of providing a convenient means for lifting and carrying a plant container to which the stake is attached. Other arrangements could be adopted to serve the same purpose. The hook has yet another benefit in that it provides an enlarged end on the top end of the stake so as to thereby avoid personal injury.

It is also preferred, as shown in FIG. 7, that at least one slender flexible finger 20 is provided on at least one of the members 8 and 16 so as to project angularly downwards from that member. In the arrangement shown, two such fingers 20 are provided on each of the two members 8 and 16. The fingers 20 add significantly to the difficulty of removing a label from the retention zone 17, 18, but do not add significantly to the difficulty of placing a label within that zone.

Figure 9:
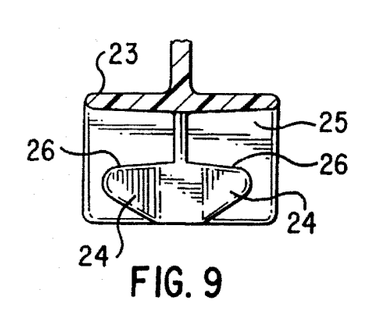
FIG. 9 is a cross-sectional view taken along line IX—IX of FIG. 8.
Figure 10:
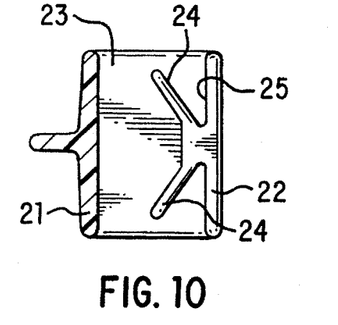
FIG. 10 is a cross-sectional view taken along line X—X of FIG. 8.

The particular mounting means 4 as shown in FIGS. 1 and 2 is shown in greater detail in FIGS. 8 to 10. That mounting means 4 includes a body of inverted substantially U-shape (FIG. 8) having two spaced sides 21 and 22 and a top 23. The side 21 is formed by part of the body of the stake 1. As will be evident from the drawings, the walls 21, 22 and 23 form between them a downwardly opening recess which is adapted to receive an upper edge of a container as shown in FIG. 3. At least one flexible detent 24 is provided on an inner surface 25 of the side 22 and is arranged to project from that surface 25 towards the other side 21. Preferably, as shown, there are two detents 24, and they project from the surface 25 to form a shallow V as shown in FIG. 10. It is also preferred that the detents 24 are spaced apart in a direction transverse to the longitudinal axis of the stake.

Each detent 24 has an operative surface 26 which is adapted to engage with the lower edge 27 of a container rim 28 as shown in FIG. 3. The surface 26 may slope at an angle so as to enable the mounting means 4 to have optimum effect when used with container rims 28 of various sizes. Alternatively or additionally, there may be three or more detents 24, and at least two of those may be relatively positioned so that their respective operative surfaces 25 are spaced a different distance from the mounting means top 23, thereby making the mounting means 4 suitable for use with rims 28 of different sizes.

When it is desired to attach the stake 1 to a container, the mounting means 4 is placed over the container rim 28 so that the rim is captured between the detents 24 and the side 21. As the stake 1 is pressed downwards, the detents 24 flex away from the side 21 to permit passage of the rim 28 deeper into the mounting means 4 towards the top 23. A stage is reached where the detents 24 are free from the flexing influence of the rim 28, and they then spring back towards the non-flexed position at which each locates, at least partially, below the lower edge 27 of the rim 28.

Stabilizing means may be provided on the stake 1 so as to coact with the container 6 and/or with soil 29 (FIG. 3) in the container 6, and thereby resist lateral tilting of the stake 1. In the particular construction shown, part of that stabilizing means is formed by a blade 30 at the lower end of the stake 1. That blade reacts with the body of soil 29 so as to resist lateral tilting of the stake 1 in the direction of arrow A as shown in FIG. 3. The detents 24 may also form part of the stabilizing means in that they can react with the container 6 so as to resist lateral tilting of the stake 1 in either of the direction shown by arrows B and C in FIG. 2.

It will be appreciated that stabilizing means different to that described could be adopted.

Figure 11:
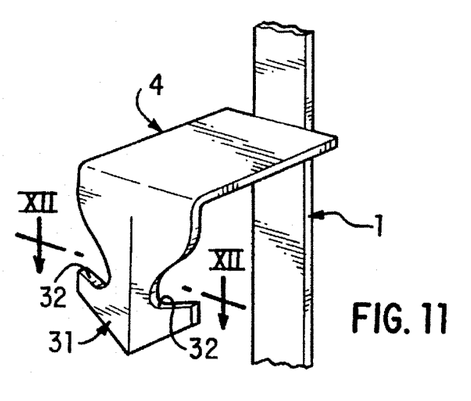
FIG. 11 is a perspective view of a modified form of mounting means.
Figure 12:
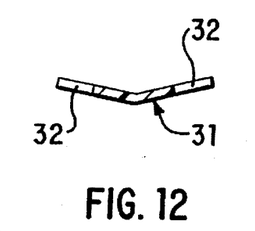
FIG. 12 is a cross-sectional view taken along line XII—XII of FIG. 11.

FIGS. 11 and 12 show a variation of the mounting means 4 in which an arrow head-like device 31 is substituted for the side 22. The device 31 has upwardly facing locking shoulders 32, and is arranged to be inserted within an aperture within a container rim so as to coact with cooperable means in the manner described in the specification of Australian Patent No. 616346. The actual form of the device 31 may vary from that shown in FIGS. 11 and 12.

Figures 13, 14, 15, 16, 17:
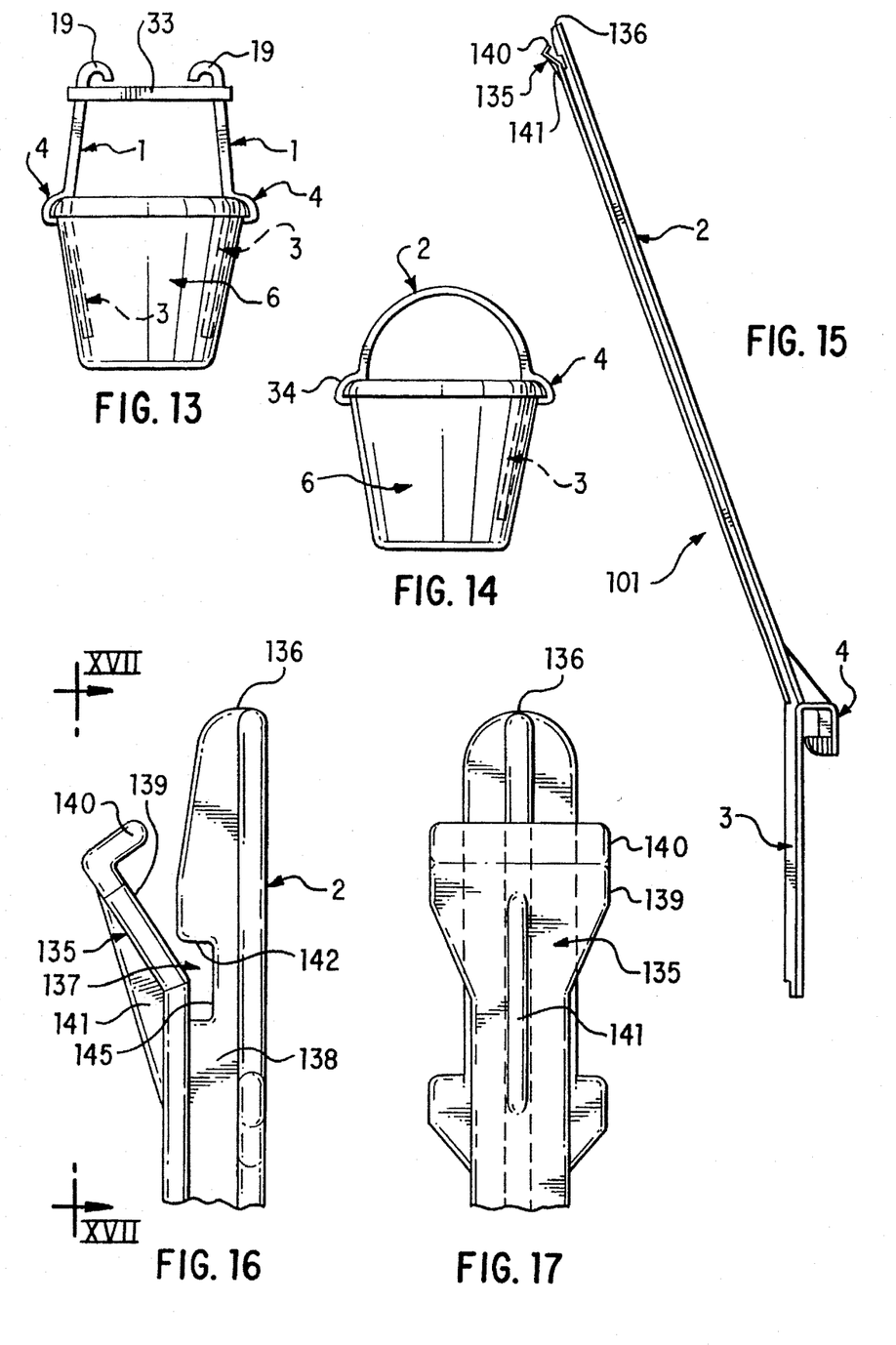
FIG. 13 is a diagrammatic view of an arrangement involving use of two stakes which are variations of the stake according to FIG. 1.
FIG. 14 is a view similar to FIG. 13 but showing another modified form of a stake.
FIG. 15 is a view similar to FIG. 1 but showing yet another embodiment of the invention.
FIG. 16 is an enlarged view of the upper section of the stake shown in FIG. 15.
FIG. 17 is a view taken along line XVII—XVII of FIG. 16.

A stake 1 according to the invention is open to substantial variation, and two possibilities are shown by FIGS. 13 and 14. In the FIG. 13 arrangement, two stakes 1 are located on respective opposite sides of the container, and the upper portion 2 of each is flexed inwards towards the other to provide for convenient carrying of the container 6. If desired, a handle device 33 may be attached to each stake 1 as shown. In the FIG. 14 arrangement, the upper portion 2 of the stake 1 is relatively long and flexible, and has connecting means 34 whereby the terminal end which is remote from the mounting means 4 can be attached to the container 6 on the side opposite to the mounting means 4. The fastener 2 thereby functions as a carrying handle, and the label retention zone can be provided at any convenient position along that handle.

A further embodiment of the invention is shown by FIGS. 15 to 20. Parts of that embodiment which correspond to parts of the previously described embodiments will be given like reference numerals except that they will be in the number series 100 to 199. The principle difference between the embodiment of FIGS. 15 to 20 and that of FIGS. 1 to 10 is the nature of the label attaching means, and consequently the following description will concentrate on that feature.

Figure 18:
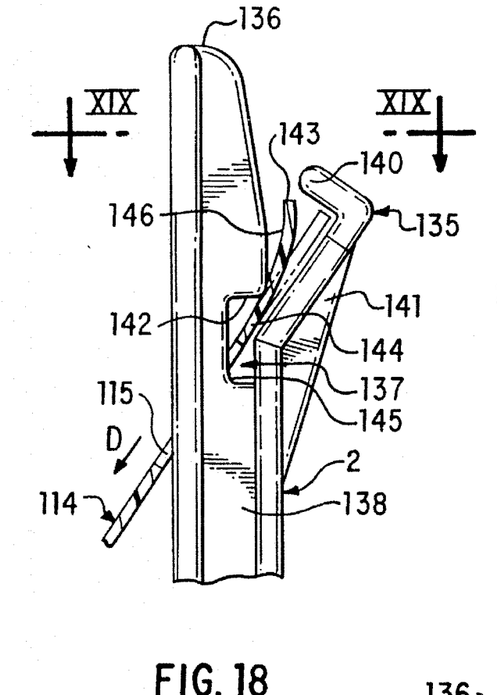
FIG. 18 is a view similar to FIG. 16 but showing a label being attached to the stake.
Figure 19:
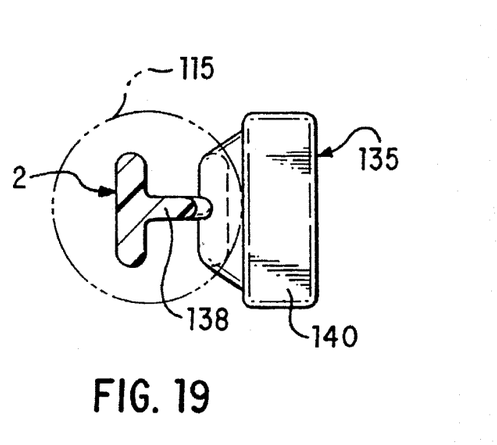
FIG. 19 is a cross-sectional view taken along line XIX—XIX of FIG. 18.
Figure 20:
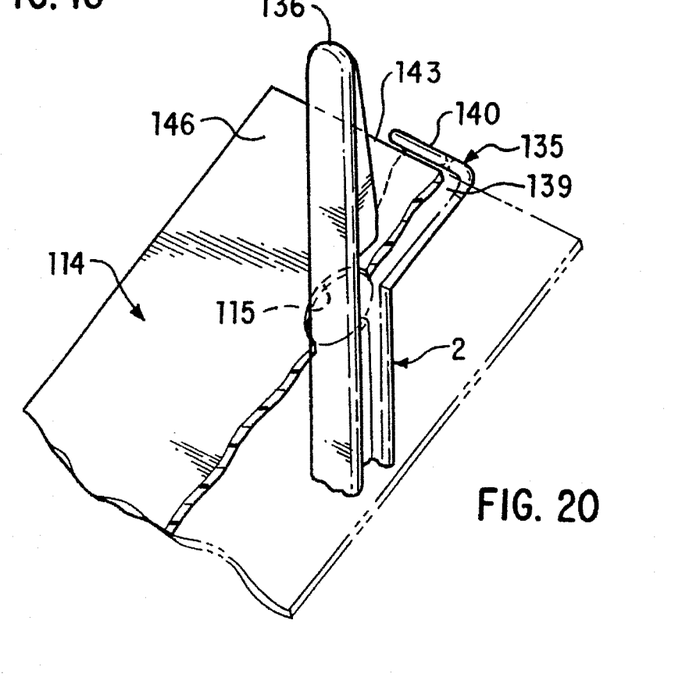
FIG. 20 is a perspective view showing a label attached the stake of FIG. 15.

In the embodiment of FIGS. 15 to 20, the label attaching means includes an arm 135 which extends laterally outwards from the upper portion 102 and is located adjacent the terminal end 136 of that portion. The attaching means also includes a recess 137 formed in a web 138 of the upper portion 102 as best seen in FIG. 16. The arm 135 is shown as extending out from the upper portion 102 at an angle other than 90 degrees, but that is not essential. The angle at which the arm 135 extends determines the disposition of an attached label 114 as shown in FIGS. 18 and 20, and that angle can be selected to suit particular requirements.

The arm 135 can have any desired form, but in the particular arrangement shown the body of that arm is in the form of a substantially flat platform 139, and an upstanding lip 140 is provided along the outer edge of that platform. A gusset web 141 may be provided beneath the arm 135 to support it against downward deflection. The recess 137 is located at the inner end of the arm 135 and forms a downwardly facing stop shoulder 142 which is the functional equivalent of the abrupt surface 12 of the embodiment shown by FIGS. 1 to 5. It will be appreciated that the shoulder 142 need not be formed by a recess as shown. By way of example, the shoulder 142 could be formed by a projection extending out from the upper portion 102.

Label attaching means of the foregoing kind is suited for use with a label 114 having an aperture 115 near one edge 143 (FIGS. 18 and 20). Preferably the aperture 115 is located approximately mid-way along the edge 143, but that is not essential. As shown in FIG. 19, the label aperture 115 is of a size such as to enable passage of a terminal part 119 of the upper portion 102. When the label 114 is moved down the stake to a position beneath the shoulder 142, the label 114 is able to be moved in the direction of arrow D as shown in FIG. 18 so that a part 144 of the label 114 is trapped beneath the shoulder 142. Movement in the direction of arrow D is limited by an edge of the aperture 115 engaging against the base 145 of the recess 137 as shown in FIG. 18.

As shown in FIG. 18, the outer part 146 of the label 114 needs to be flexed in order to enable the label part 144 to locate beneath the shoulder 142. When the label 114 is positioned as shown in FIG. 18, the label edge 143 is located at or inside the inner surface of the lip 114, and that permits the label outer part 146 to move into its normal relatively flat condition as shown by the broken line in FIG. 18. In that condition, the label outer part 146 lies against the platform 139 and the label edge 143 is placed in engagement with, or opposed relationship with, the lip 140 as shown in FIG. 20. As a result, the label part 146 is trapped between the lip 140 and the recess base 145, and the label needs to be distorted in order to remove it from the influence of the label attaching means.

It is preferred that the shoulder 142 is located close the platform 139 so as to closely confine the label 114 when it is positioned as shown in FIG. 20, and thereby minimise the possibility of the label 114 being inadvertently freed from the retaining influence of the attaching means. As will be apparent from FIG. 20, cooperation between the label edge 143 and the lip 140 prevents the label from rotating about the axis of the upper portion 102.

Figure 21:
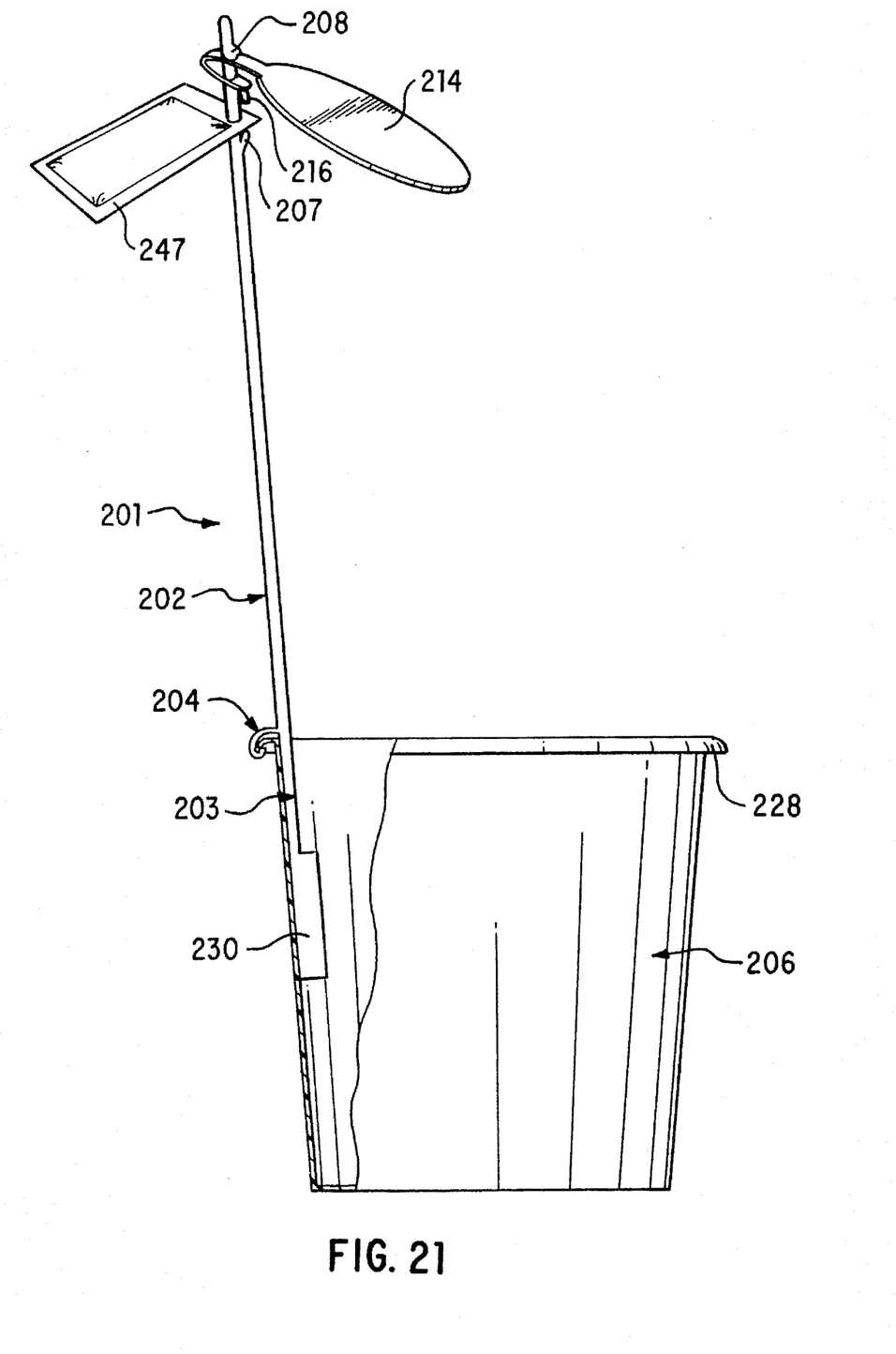
FIG. 21 is a semi-diagramatic view of another embodiment of the invention.

Still another embodiment of the invention is shown by FIG. 21. Parts of that embodiment which correspond to parts of the embodiment shown by FIGS. 1 to 10 will be given like reference numerals except that they will be in the number series 200 to 299.

FIG. 21 shows another type of label attaching means in which each of three stops 208, 216 and 207 is formed by a flexible member projecting out from the body of the stake 201. Each member extends outwardly and downwardly so as to facilitate the passage of a label downwardly over the member, and yet provide an effective barrier to removal of the label from the attached condition. The label 214 may be of a form as disclosed by New Zealand patent application 244712, but that is not essential. The item 247 may be a promotional document, or a package of fertilizer or other material.

It will be evident from the foregoing description that a stake according to the invention has significant advantages over the prior art. It provides a convenient and effective means of securely attaching a label to a container, and has the further advantage of being reusable with different labels in different circumstances. The stake is mounted on a container so as to ensure that the label is retained in a conveniently visible position, thereby aiding selection of plants by consumers.

Various alterations, modifications and/or additions may be introduced into the constructions and arrangements of parts previously described without departing from the spirit or ambit of the invention.

Having now described our invention, what we claim as new and desire to secure by Letters Patent is:

1. A plant container label display stake including; (a) an elongate body having an upper label receiving portion and a lower mounting portion, said upper portion being insertable through an aperture of a label and having label attaching means which is operative to releasably retain the label on said stake at a label retention zone remote from said lower portion, said zone being formed between two stops which are spaced apart in the longitudinal direction of said body, said lower portion being locatable within a plant container so as to lie against the inner surface of a side wall of the container; and (b) mounting means on said elongate body which is engageable with a plant container so as to resist separation of said stake and container and retain said stake in a substantially upright position with said upper portion extending above the top of said container and said lower portion engaging said wall inner surface, said mounting means including a downwardly facing recess adapted to receive part of an upper edge of a plant container, and at least one flexible detent provided within said recess and being operable to locate beneath a rim at the top edge of said plant container.

2. A stake according to claim 1, wherein said zone is divided into two parts, one of which is operable to retain a label and the other is operable to retain another item.

3. A stake according to claim 2, wherein said two stops are formed by a stop shoulder and a first stop member respectively which are located on said upper portion so that said stop shoulder is positioned between said first stop member and said lower portion, and a second stop member is provided on said upper portion and separates said two parts of the zone.

4. A stake according to claim 3, wherein each said stop member has a sloping surface which is remote from said lower portion and is operable to facilitate movement of a said label or a said item into a respective one of said zone parts.

5. A stake according to claim 3, wherein at least one slender finger is provided on at least one said stop member, and said finger extends from the stop member in a direction towards said lower portion.

6. A stake according to claim 1, wherein a terminal end part of said upper portion which is remote from said lower portion is of hook-like form.

7. A stake according to claim 1, wherein one said stop is formed by an arm extending laterally from said upper portion and the other said stop is formed by a shoulder arranged in substantially opposed relationship to said arm.

8. A stake according to claim 7, wherein said arm and said shoulder are spaced apart by a distance such as to closely confine a said label between them.

9. A stake according to claim 7, wherein said arm slopes at an angle other than 90 degrees relative to the longitudinal axis of said upper portion.

10. A stake according to claim 7, wherein said arm is in the form of a platform having a flat surface facing away from said lower portion.

11. A stake according to claim 7, wherein an upstanding lip is provided at an end of said arm remote from said stake body and is engagable with an edge of a label retained by said attaching means so as to prevent rotation of said label about the axis of said upper portion.

12. A stake according to claim 7, wherein said shoulder is formed by one side of a recess in said stake body.

13. A stake according to claim 1, wherein said detent has a sloping lower surface which is operable to ramp over the rim of a plant container during attachment of said stake to that container.

14. A stake according to claim 1, wherein there are two said detents which are spaced apart in a direction transverse to the axis of said upper portion.

15. A stake according to claim 1, wherein said recess is formed by a U-shaped member having a top wall and two laterally spaced side walls which depend from said top wall.

16. A stake according to claim 1, wherein stabilizing means is provided on said stake so as to resist lateral tilting of the stake when it is mounted on a container.

17. A stake according to claim 16, wherein said stabilizing means includes a blade-like member located adjacent a lower end of said lower portion and which is adapted to coact with a body of soil within which said lower portion is located.

18. A stake according to claim 16, wherein said stabilizing means includes part of said mounting means which is cooperable with a said container to resist tilting of the stake relative to the container.

19. A stake according to claim 1, wherein said upper and lower portions have their respective axes arranged angularly relative to one another.

20. A plant container label display stake formed as a single piece and including: (a) an elongate body having an upper label receiving portion and a lower mounting portion, said upper portion being insertable through an aperture of a label and having label attaching means which is operable to releasably retain said label on said stake at a label retention zone remote from said lower portion, said attaching means including two stops spaced apart in the longitudinal direction of said body and between which said label retention zone is formed, said lower portion being locatable within a plant container so as to lie against the inner surface of a side wall of the container; and (b) mounting means located at the junction of said upper and lower portions and which is engageable with an upper edge of a plant container so as to hold said lower portion against said inner surface and resist withdrawal of said lower portion out of said container, said mounting means including a downwardly facing recess adapted to receive part of an upper edge of a plant container, and at least one flexible detent provided within said recess and being operable to locate beneath a rim at the top edge of said plant container.

* * * * *